United States Patent Office 3,353,171
Patented Nov. 14, 1967

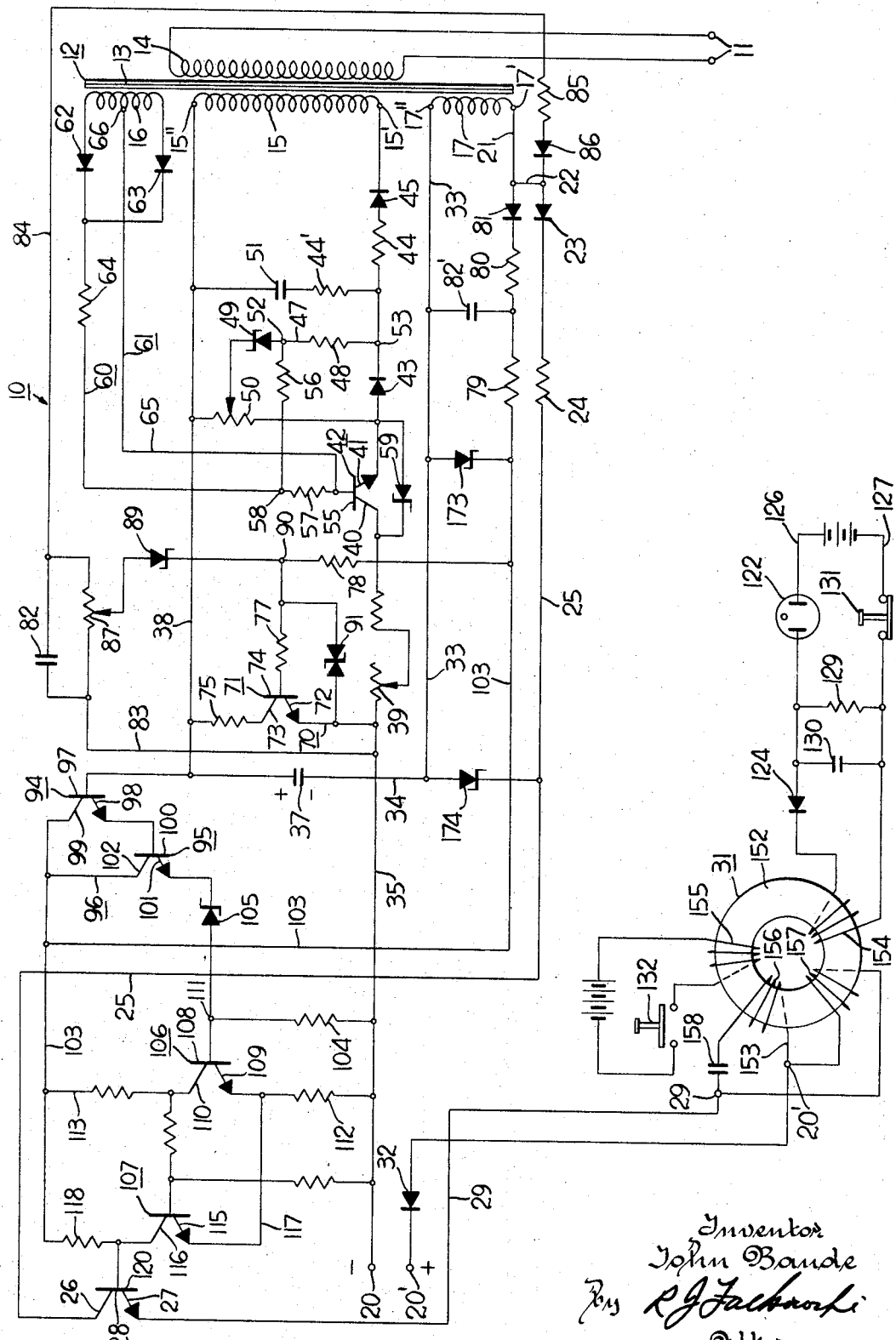

3,353,171
MAGNETIC DEVICE FOR INDICATING THE OCCURRENCE OF AN ELECTRICAL SIGNAL
John Baude, Milwaukee, Wis., assignor to Allis-Chalmers Manufacturing Company, Milwaukee, Wis.
Original application Dec. 23, 1960, Ser. No. 78,060, now Patent No. 3,176,145, dated Mar. 30, 1965. Divided and this application Nov. 27, 1964, Ser. No. 414,305
5 Claims. (Cl. 340—253)

ABSTRACT OF THE DISCLOSURE

A static relay device is connected to respond to an overcurrent in a power circuit by closing a transistor switching circuit. The closing of the switch produces an output indicating the fault and also passes current to an annunciator circuit which uses a transformer having a square loop magnetic core. The current passes through two parallelly connected windings around the core. A capacitor is connected in series with one of the windings to provide a path for transient pulses. The turning on of the transistor switching circuit to pass current through the parallel windings on the core provides a sufficient voltage at a secondary winding to turn on a neon bulb that indicates the occurrence of an overcurrent. A battery is connected to another coil on the core through a switch to provide a means to reset the core and a switch is provided in the lamp circuit to extinguish the neon after resetting of the core.

---

Reference for this divisional application is made to copending application for Static Relay System Employing Improved Annunciator Devices, Baude, Ser. No. 78,060, filed Dec. 23, 1960, now Patent No. 3,176,145 for purposes of obtaining the benefit of the filing date.

This invention relates to annunciator or indicating devices, particularly devices that indicate the occurrence of an electrical signal.

In the indicating device disclosed and claimed static circuits are used making possible the use of miniaturized components of high reliability which are not affected by vibration or mechanical shock or other adverse environmental conditions. The indicating device is highly reliable since it does not depend on accurate calibration of devices, such as relays, involving moving parts.

Proper indication of occurrence of a fault or similar occurrence such as provided by a relay operation is an important phase in the operation of an electric power distribution system. One presently used means of indicating relay operation consists of "targets" which are electromechanical devices which function to release a flag indicating that the coil circuit of a relay device has been energized. This target is operated by a coil that is connected into the relay operating contact circuit. Since these devices have to be made rather small to fit into the relay cases and to provide for the necessary fast pickup time, their restraining forces have to be kept small. It is therefore possible that excessive vibration, such as may occur during circuit breaker operation, prematurely releases the target giving false indications.

In accordance with the invention claimed, a new and improved annunciator or indicating device is provided for responding to the occurrence of an electrical signal. The electrical signal may be produced by an overcurrent static relay or similar apparatus. The annunciator responds to the occurrence of the electrical signal to activate a visual indicating device, such as a lamp. A memory core and means for determining the state of energization of the memory core also may be employed, if desired.

The objects of this invention are to provide a new and improved annunciator system or indicating device for static relays or similar devices; and to provide a new and improved static annunciator device that is not likely to give erroneous signals because of electrical noise, transient currents, or mechanical vibration.

Objects and advantages other than those set forth will be apparent from the following description.

The figure is a diagrammatic view of a protective system and indicating device embodying the invention.

The figure illustrates a protective relay system 10 that is utilized for sensing a variable electrical condition in a power source 11. Relay system 10 receives power from source 11 through a transformer 12. Transformer 12 comprises a core 13, at least one input or primary winding 14 directly connected across the power source 11, and a plurality of secondary windings, for example, windings 15, 16 and 17. If the power source 11 transmits, for example, a series of electrical pulses then the secondary windings associated with transformer 12 transmit a plurality of signal pulses to the relay system 10.

System 10 responds to the signal pulses to provide an output across output terminals 20 and 20'. This output signal is derived from secondary winding 17 of transformer 12 from a terminal 17' of winding 17 and is transmitted to terminal 20' through conductor 21, conductor 22, diode 23, resistor 24, conductor 25, collector 26 and emitter 27 of a normally non-conductive transistor 28, conductor 29, a primary winding 153 of a transformer 31, and diode 32; and to terminal 20 from a terminal 17" of winding 17 through conductors 33, 34, and 35.

Transistor 28 controls current to terminals 20 and 20' and is in turn controlled by the integrated effects of the electrical energy received from secondary windings 15, 16, and 17 of transformer 12.

The outputs of secondary windings 15, 16, and 17 are used to control the condition of transistor 28. Electrical energy emitted by winding 15 charges a capacitor 51 through a resistor 44' and, above a certain predetermined energy level, also charges a capacitor 37. Capacitor 37 may be directly connected to a terminal 15" of secondary winding 15 through a conductor 38 and to a terminal 15' of secondary winding 15 through an adjustable resistor 39.

A collector 40 and an emitter 41 of a transistor 42 are connected in series with a diode 43, a resistor 44, a diode 45, a conductor 46, resistor 39, and capacitor 37. When capacitor 37 has received a predetermined electrical charge, transistor 28 becomes conductive and passes electrical energy from secondary winding 17 of transformer 12 to terminals 20 and 20'. The absorbed energy in capacitor 37 provides the required inverse time energy functions for controlling triggering action.

Transistor 42 is normally biased to cut off, but is rendered conductive when the energy transmitted from secondary winding 15 reaches a predetermined level. This predetermined level is established as the operating point of the relay. Transformer 12 transmits electrical energy up to a predetermined level without charging capacitor 37 because transistor 42 is retained biased in its nonconductive state.

In order to control the point of conduction of transistor 42 a shunting or sensing device or circuit 47 is arranged across secondary winding 15 of transformer 12 and comprises a resistor 48, a Zener diode 49, and a potentiometer 50. Capacitor 51 is connected across secondary winding 15 and in series with resistor 44 and diode 45 for stabilizing purposes. Diode 45 and resistor 44 control the charge of capacitor 51 on each electrical pulse of proper polarity applied to primary winding 14. Zener diode 49 breaks down at a predetermined voltage and starts to pass current. When Zener diode 49 passes current, a voltage appears across resistor 48 which renders a point 52 in circuit 47 positive with respect to a point 53.

Point 52 is connected to a base 55 of transistor 42 through resistors 56 and 57. Making point 52 positive with respect to point 53 makes base 55 of transistor 42 positive relative to emitter 41 and renders it conductive. When Zener diode 49 is nonconductive, base 55 of transistor 42 is biased negative with respect to emitter 41 rendering transistor 42 nonconductive. When Zener diode 49 is conductive, transistor 42 is rendered conductive and passes current to capacitor 37. In order to limit the voltage drop across transistor 42 at cutoff, a Zener diode 59 is applied in shunting arrangement across its emitter and collector.

In order to provide additional means for controlling the transfer of energy by means of transistor 42, voltages of varying polarity, phase angle, and frequency are applied across resistor 57 either continually or periodically for aiding or restraining the effect of the DC bias as provided by the action of Zener diode 49.

In order to restrict the amount of energy transferred to capacitor 37, a restraining signal is applied to base 55 of transistor 42 from secondary winding 16 of transformer 12 through circuits 60 and 61. Circuit 60 comprises a pair of diodes 62 and 63 connected as shown in series with resistors 64 and 57. Circuit 61 comprises a conductor 65 connected at one end to base 55 of transistor 42 and at the other end to a center tap 66 of secondary winding 16. The voltage pulses from winding 16 are applied across resistor 57 and in combination with the signal from Zener diode 49 render transistor 42 periodically conductive. The restraining signal from winding 16 renders transistor 42 conductive for only a part of a cycle so that the time duration of current conduction, for example, the width and amplitude of the current cycle passed by transistor 42, may be controlled. By varying the position of potentiometer 50 and the resistance of resistor 64 the inverse time current characteristics of the relay may be varied.

Because transistor 42 might pass a slight amount of current and eventually trip the flip-flop circuits controlling transistor 28, another sensing circuit such as a circuit 70 is connected across capacitor 37. Circuit 70 comprises a transistor 71 having an emitter 72, a collector 73 and a base 74. Emitter 72 and collector 73 are connected in series with a resistor 75 across capacitor 37, as shown. Transistor 71 may be, for example, kept conductive by means of the circuitry connected to its base 74 when transistor 42 is rendered nonconductive. Transistor 71 is rendered conductive at a selected proportion of the voltage across a capacitor 82 and is connected to terminal 17' of winding 17 through resistors 77, 78, 79, and 80 and a diode 81. Transistor 71 is rendered nonconductive when capacitor 82 is charged to a predetermined value. Capacitor 82 is connected through conductors 83, 34, and 33 to terminal 17" and through a conductor 84, a resistor 85, a diode 86, and conductors 22 and 21 to terminal 17'.

A potentiometer 87 is connected across capacitor 82 with one terminal thereof connected through a Zener diode 89 to a point 90 between the series connection of resistors 77 and 78. When the potential across capacitor 82 reaches a predetermined value, Zener diode 89 breaks down and conducts current. When Zener diode 89 conducts, the potential on base 74 of transistor 71 is changed from positive to negative with respect to its emitter 72 and transistor 71 becomes nonconductive. When transistor 71 is nonconductive the shunt circuit across capacitor 37 comprising the emitter-collector circuit of transistor 71 is interrupted. A charge then builds up across capacitor 37 upon the conduction of the emitter-collector circuit of transistor 42. A double anode Zener diode 91 is connected in shunting arrangement across the emitter 72 and base 74 of transistor 71 to protect the transistor against abnormally high voltage pulses.

In order to increase the input impedance to the static flip-flop circuit controlling transistor switch 28, a pair of transistors 94 and 95 are used in a sensing circuit 96 provided for checking the charge on capacitor 37. Transistor 94 comprises a base 97, an emitter 98, and a collector 99. Transistor 95 comprises a base 100, an emitter 101 and a collector 102. Base 97 of transistor 94 is connected to the positive terminal of capacitor 37 and emitter 98 is connected to base 100 of transistor 95. Collectors 99 and 102 of transistors 94 and 95, respectively, are connected through a conductor 103, resistors 79 and 80, diode 81 and conductor 21 to terminal 17' of secondary winding 17.

The positive charge on capacitor 37 is applied to base 97 of transistor 94. Emitter 98 of transistor 94 and emitter 101 of transistor 95 assume essentially a potential slightly more positive than that of conductor 35 when capacitor 37 is in a state of discharge because of the leakage current flowing from conductor 103 through collector 99 and emitter 98 of transistors 94 and collector 102 and emitter 101 of transistor 95, through a Zener diode 105, and a resistor 104 to conductor 35. The voltage which appears between conductors 35 and 103 is limited by a Zener diode 173.

Transistors 94 and 95 are connected in a type of connection known as "compound-emitter-follower." The emitter potentials are slightly more negative than the base potentials of the transistors 94 and 95. Thus, if the voltage on capacitor 37 exceeds the breakdown voltage of Zener diode 105, emitters 101 and 98 are held at a potential determined by the voltage drop across resistor 104 and Zener diode 105. As the charge on capacitor 37 continues to rise, bases 100 and 97 of transistors 95 and 94 become more positive than the respective emitters 101 and 98 and current flows from terminal 17' of winding 17 through conductor 21, diode 81, resistor 80, resistor 79, conductor 103, collector 99 and emitter 98 and collector 102 and emitter 101 of transistors 95 and 94, respectively, and through Zener diode 105, resistor 104, conductors 35, 34 and 33 to terminal 17" of winding 17.

Under this operating condition base current of transistors 94 and 95 is flowing from terminal 15" of winding 15 through conductors 38, base 97 and emitter 98 of transistor 94, base 100 and emitter 101 of transistor 95, Zener diode 105, resistor 104, conductor 35, resistor 39, collector 40 and emitter 41 of transistor 42, diode 43, resistor 44, diode 45, conductor 46 and terminal 15' of winding 15.

The conduction of transistor 95 through its emitter-collector circuit actuates the switch or flip-flop circuit comprising transistors 106 and 107. Transistor 106 comprises a base 108, an emitter 109 and a collector 110. Base 108 is connected at a point 111 between resistor 104 and diode 105 in series with conductors 103 and 35 in the emitter-collector circuits of transistors 95 and 96. The flow of current through the latter circuit applies a positive potential with reference to emitter 109 to base 108 of transistor 106 and renders it conductive. Current then flows from conductor 103 through a conductor 113, collector 110 and emitter 109 of transistor 106, and a resistor 112 to conductor 35.

In the usual manner for flip-flop circuits of the type shown in the circuits for transistors 106 and 107, when current flows through the emitter-collector circuit of transistor 106, the base of transistor 107 is rendered negative with respect to its emitter 115 and current flows from conductor 103 (considered positive in polarity) through a resistor 118, collector 116 and emitter 115, a conductor 117, and resistor 112 to conductor 35 (considered negative in polarity). The discontinued flow of current through the emitter-collector circuit of transistor 107 renders a base 120 of transistor 28 positive thereby rendering transistor 28 conductive. Transistor 28 then passes current from winding 17 through conductors 21, 22, diode 23, resistor 24, conductor 25, collector 26, emitter 27, conductor 29, primary winding 153 of transformer 31, diode 32 to the positive terminal 20' of the relay output signal terminals 20 and 20'. The amplitude of the signal passed by transistor 28 is limited by a Zener diode 174.

Means are provided responsive to current in primary winding 153 for producing an indication of the current of the electrical signal. A secondary winding 154 of transformer 31 is connected in series with a diode 124 and a capacitor 130. The electrical pulses emitted by winding 154 when transistor 28 passes current through winding 153 are stored in capacitor 130. This voltage is added to the voltages existing between conductors 126 and 127 and triggers a visual indicating device such as neon light 122, into conduction. Current then flows from the battery through conductor 127, a normally closed push button 131, and a resistor 129. The neon stays on until push button 131 is operated to interrupt the current flow causing the neon light to extinguish itself.

Transformer 31 comprises a core 152 that may have a square loop characteristic to provide a memory core. Winding 153 comprises two substantially equal portions 156 and 157 which are connected in opposition to each other on core 152. A capacitor 158 is connected in series with portion 156. Small current pulses of short duration that enter these two portions create two flux components in core 152 that oppose each other and therefore are ineffective to set the core or change its flux characteristics. When the relay functions to produce a signal, transistor 28 transmits current pulses of sufficient duration to permit capacitor 158 to charge. With capacitor 158 charged, current flows in only one portion of the winding, and "sets" the core. Thus, small inductive surges cannot cause a malfunction of the indicating system.

A winding 155 is connected in series with a direct current source and a switch 132. This winding is used to reset the core, if necessary, after a signal has occurred.

In describing the invention, the preferred embodiment has been shown and described, but it is obvious to one skilled in the art that there are many variations, combinations, alterations and modifications that may be made without departing from the spirit of the invention or from the scope of the appended claims.

The embodiments of the invention in which an exclusive property or privilege is claimed are defined as follows:

1. Means for producing an indication of the occurrence of an electrical signal, said means comprising:
    a magnetic core;
    a first winding mounted on the core and connected to receive the electrical signal as an input, said first winding having two substantially equal portions wound in opposition to each other;
    a capacitor connected in series with only one of the portions of the first winding;
    a second winding mounted on the core; and
    means connected to the second winding and responsive to current in said second winding for producing an indication of said occurrence.

2. An indicating circuit for producing an indication of the occurrence of an electrical signal, said circuit comprising:
    a magnetic core;
    a first winding mounted on the core and connected to receive the electrical signal as an input, said first winding having two substantially equal portions wound in opposition to each other;
    a capacitor connected in series with only one of the portions of the first winding;
    a second winding mounted on the core; and
    a circuit comprising a visual indicating device connected to the second winding and responsive to current in said second winding to activate said indicating device of said occurrence.

3. An indicating circuit for producing an indication of the occurrence of an electrical signal, said circuit comprising:
    a magnetic core having a square loop characteristic;
    a first winding mounted on the core and connected to receive the electrical signal as an input, said first winding comprising two substantially equal windings connected in parallel and wound in opposition to each other;
    a capacitor connected in series with only one of the two substantially equal windings of the first winding;
    a second winding mounted on the core adapted to produce current in response to setting of the core; and
    a circuit comprising a visual indicating device connected to the second winding and responsive to current in said second winding in only one direction to activate said indicating device.

4. An indicating circuit for producing a visual indication of the occurrence of an electrical signal, said circuit comprising:
    a magnetic core having a square loop characteristic;
    a first winding mounted on the core connected to receive the electrical signal, said first winding comprising two substantially equal portions wound in opposition to each other and connected in parallel with each other;
    a capacitor connected in series with only one of the two portions of the first winding;
    a second winding mounted on the core; and
    a circuit comprising a series connected indicating lamp, a diode and an auxiliary power source connected in series with the second winding to turn on the lamp upon saturation of the core in one direction.

5. An indicating circuit for producing a visual indication of the occurrence of an electrical signal, said circuit comprising:
    a magnetic core having a square loop characteristic;
    a first winding mounted on the core connected to receive the electrical signal, said first winding comprising two substantially equal portions wound in opposition to each other and connected in parallel with each other;
    a capacitor connected in series with only one of the two portions of the first winding;
    a second winding mounted on the core;
    a circuit comprising a series connected indicating lamp, a diode, an auxiliary power source, and a normally closed switch connected in series with the second winding to turn on the lamp upon saturation of the core in one direction; and
    a reset circuit comprising a winding mounted on the core wound in a direction to effect saturation of the core in another direction, a normally open switch, and a power source connected in series.

References Cited

UNITED STATES PATENTS

| | | | |
|---|---|---|---|
| 1,015,192 | 1/1912 | Knopp. | |
| 2,285,912 | 6/1942 | De Monte | 340—253 |
| 2,419,771 | 4/1947 | Goddard | 323—60 |
| 2,719,288 | 9/1955 | Young | 340—253 |

FOREIGN PATENTS 264,741   2/1950   Switzerland.

THOMAS B. HABECKER, *Acting Primary Examiner.*

NEIL C. READ, *Examiner.*

D. K. MYER, *Assistant Examiner.*